Figure 1:
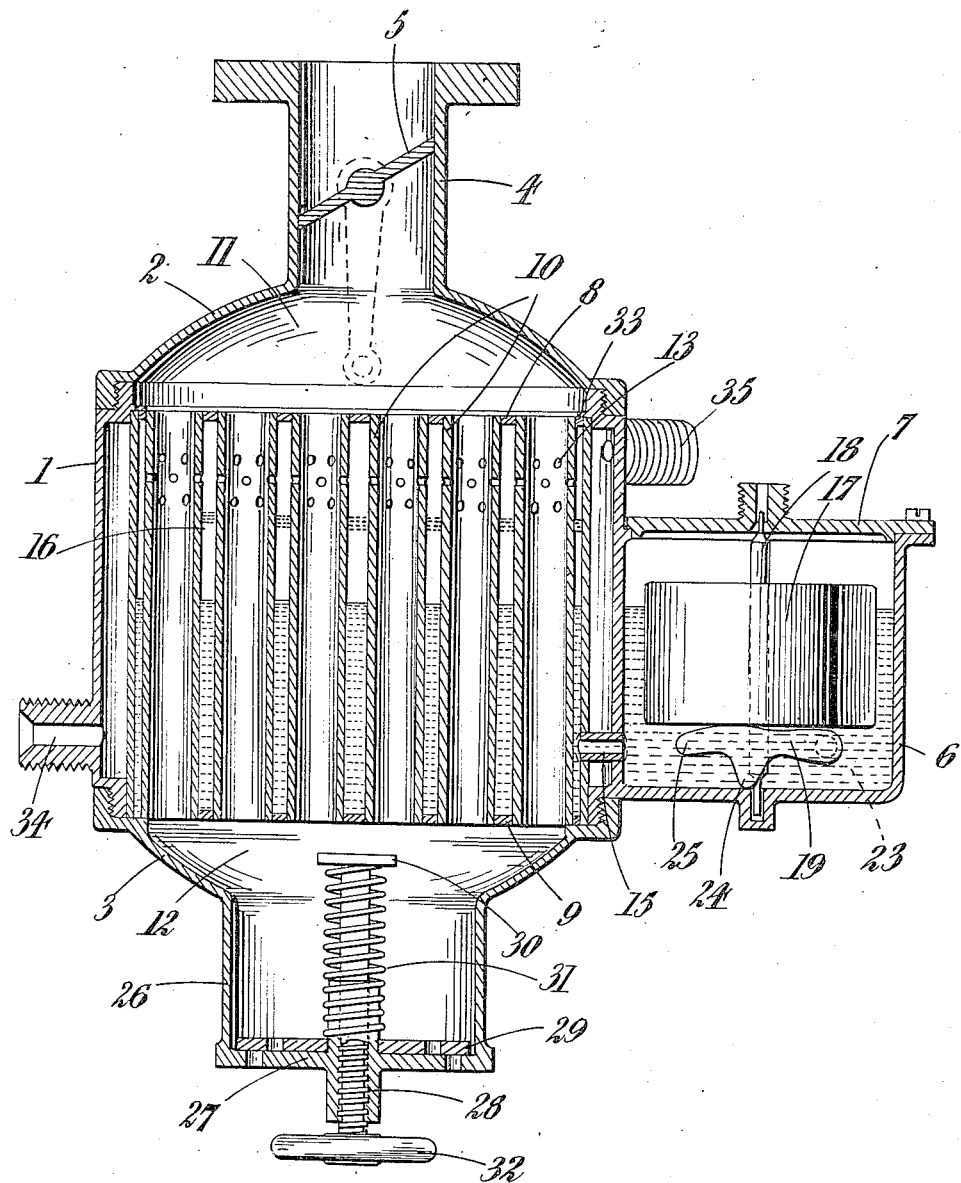

M. B. B. BOYD & J. RICKARD.
VAPORIZING AND CARBURETING DEVICE.
APPLICATION FILED AUG. 28, 1911.

1,067,582.

Patented July 15, 1913.

7 SHEETS—SHEET 4.

M. B. B. BOYD & J. RICKARD.
VAPORIZING AND CARBURETING DEVICE.
APPLICATION FILED AUG. 28, 1911.

1,067,582.

Patented July 15, 1913.

7 SHEETS—SHEET 5.

M. B. B. BOYD & J. RICKARD.
VAPORIZING AND CARBURETING DEVICE.
APPLICATION FILED AUG. 28, 1911.

1,067,582.

Patented July 15, 1913.

7 SHEETS—SHEET 6.

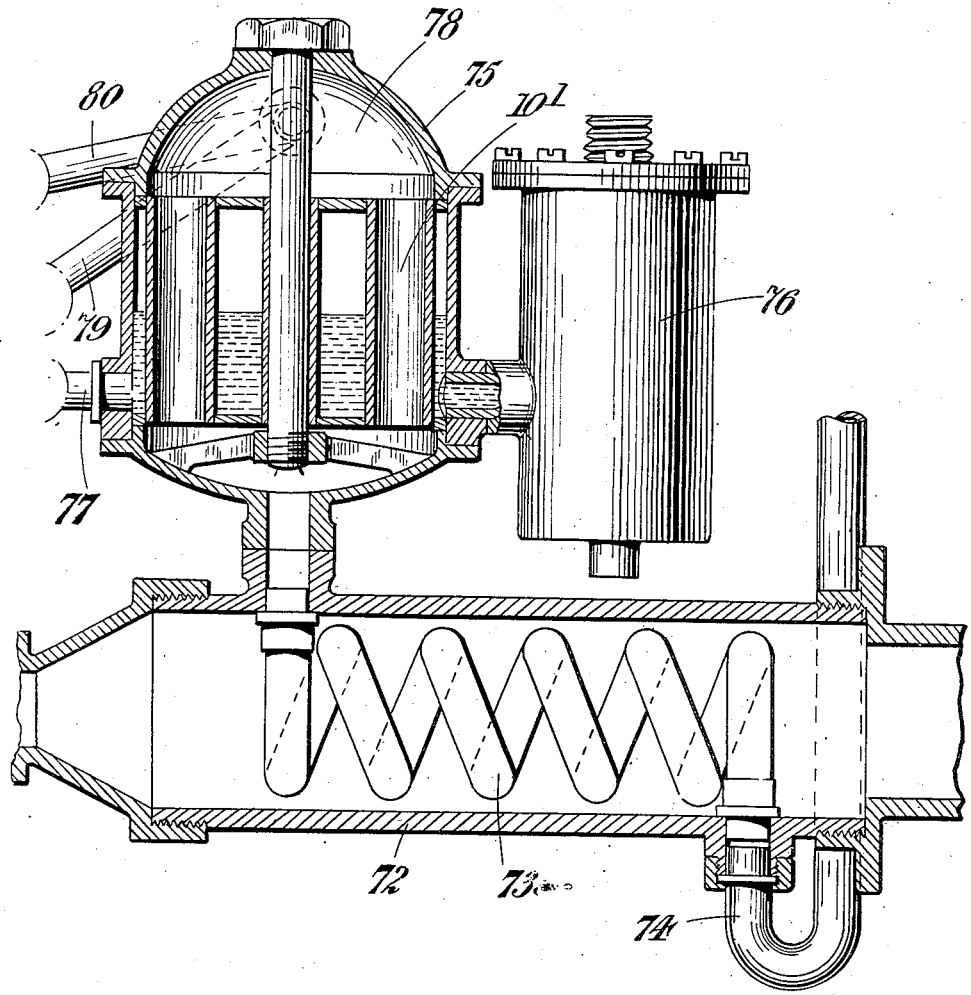

UNITED STATES PATENT OFFICE.

MAXIM BERNARD BECKER BOYD AND JAMES RICKARD, OF LONDON, ENGLAND.

VAPORIZING AND CARBURETING DEVICE.

1,067,582.     Specification of Letters Patent.     Patented July 15, 1913.

Application filed August 28, 1911. Serial No. 646,377.

*To all whom it may concern:*

Be it known that we, MAXIM BERNARD BECKER BOYD and JAMES RICKARD, subjects of the King of England, both residing at London, England, have invented certain new and useful Improvements in Vaporizing and Carbureting Devices, of which the following is a specification.

The present invention relates to vaporizing and carbureting devices suitable for use in connection with internal combustion engines or with lamps, stoves and other devices for producing light or heat.

We will describe several specific means for carrying out our invention in the form of a vaporizer or carbureter for use with internal combustion engines.

It is well known that the carbureters now employed on motor vehicles, motor boats and aeroplanes generally have one or more jets which deliver fuel in bulk with the disadvantage that the cylinders are frequently flooded, and the lubrication of the pistons in the cylinder is seriously interfered with. Moreover, the employment of jets for feeding the fuel in bulk increases the liability of stoppage due to dirt or impurities admitted with the fuel whereby the carbureter is not infrequently choked or put out of use.

One object of the present invention is to dispense with the jets and instead of feeding the fuel in bulk to feed it in a more attenuated form thereby not only increasing the efficiency of the vaporizer or carbureter but also economizing the fuel consumption and incidentally preventing flooding of the cylinders and choking of the carbureters.

Another object of our invention is to accomplish the mixing of the fuel vapor and air in a chamber into which the fuel cannot overflow and to deliver the air as direct as possible into the fuel chamber, that is to say, with a minimum amount of changing in its direction from the inlet.

According to this invention there is provided a vaporizer or carbureter comprising an air chamber, a fuel chamber, and a mixing chamber formed by tube plates and tubes arranged within a common casing.

The invention further comprises a fuel container arranged between an air chamber and a mixing chamber, and air ducts passing through the fuel to establish communication between the interior of the fuel container, the mixing chamber and the air chamber. Preferably the main air supply is admitted through an automatic valve.

Further features of this invention consist in constructional details which will be hereinafter more fully referred to in connection with the accompanying drawings—

Figure 2:
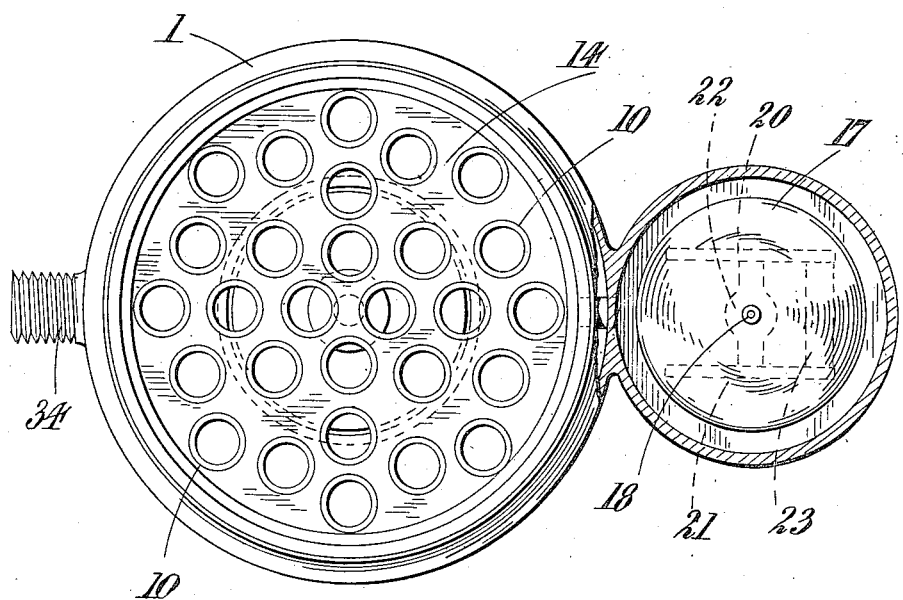
Figure 3:
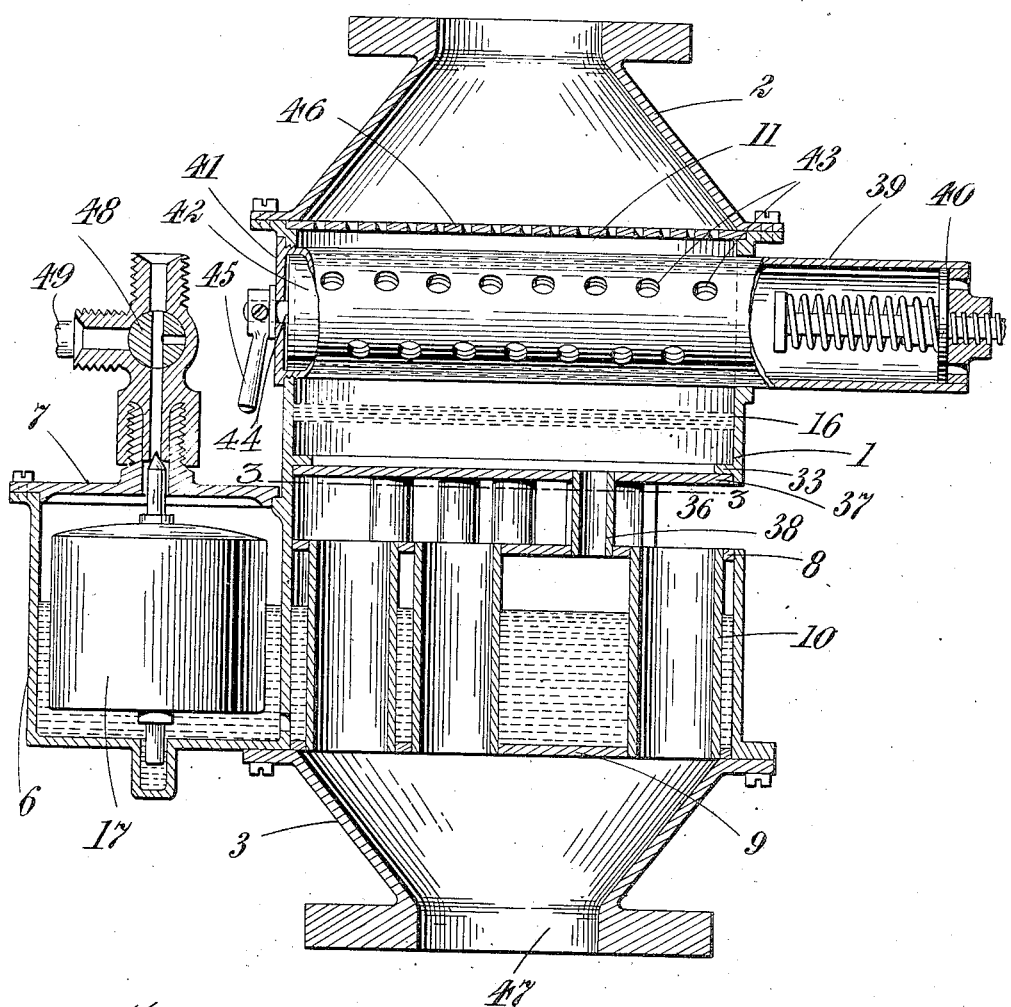
Figure 4:
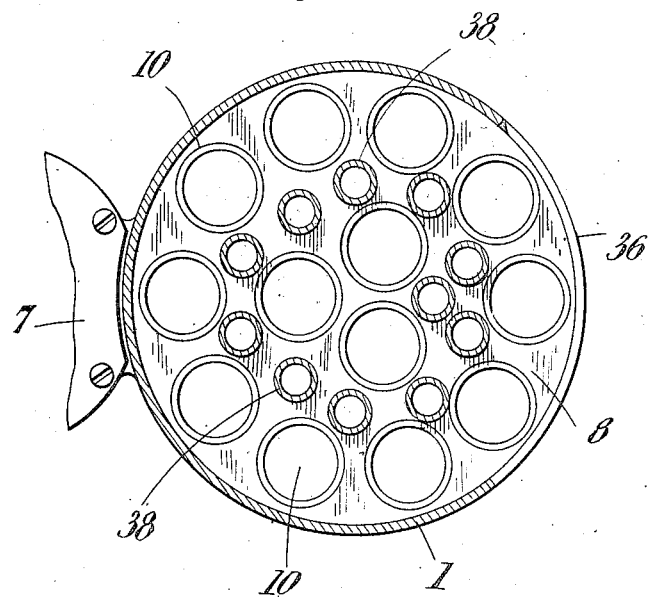
Figure 7:
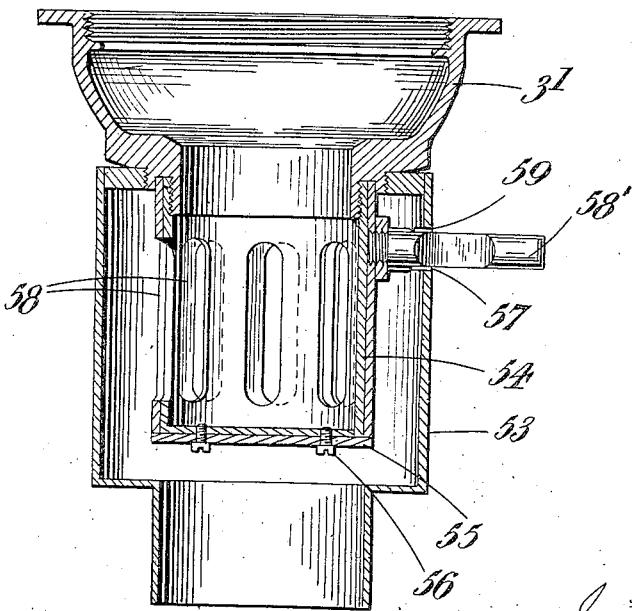
Figure 5:
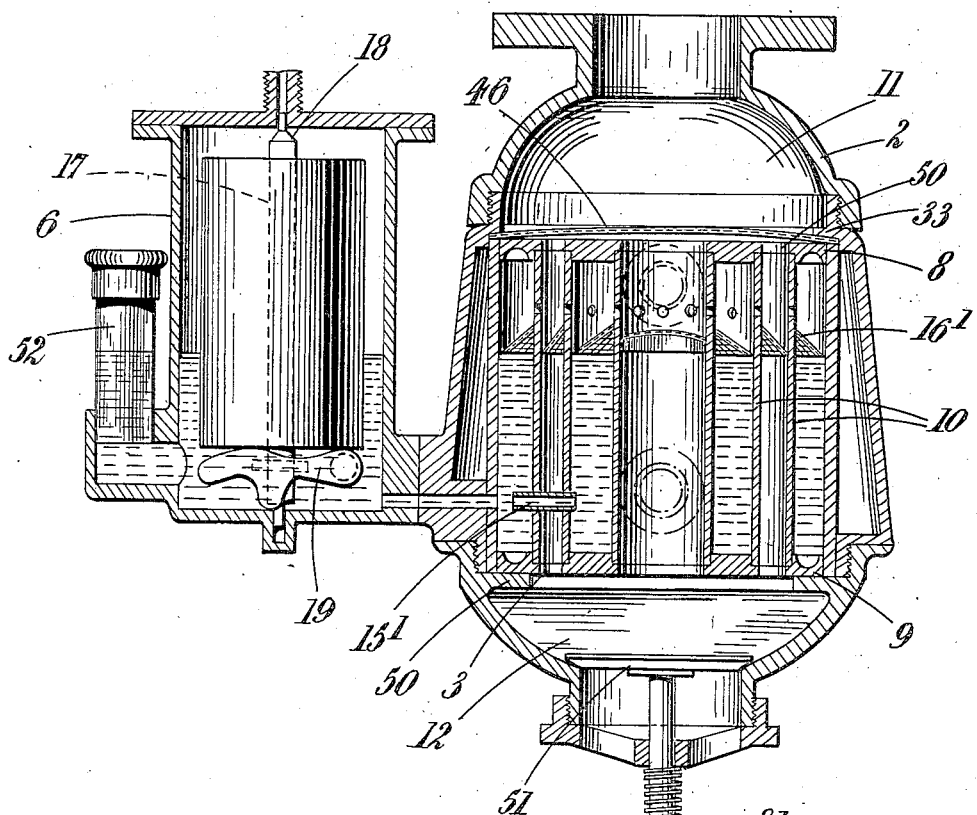
Figure 6:
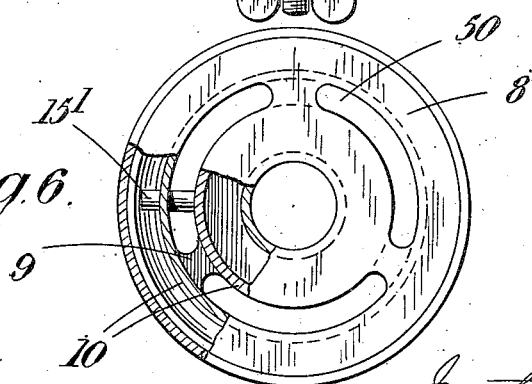

Figure 1 is a vertical cross-section of a vaporizer or carbureter; Fig. 2 is a plan view of the vaporizer or carbureter shown in Fig. 1 with a cover removed and showing the float chamber in section. Fig. 3 is a vertical section of a modification adapted for vaporizing heavy oils. Fig. 4 is a cross-section on the line 303 of Fig. 3 with the float chamber broken away. Fig. 5 is a vertical section of a modified form of vaporizer or carbureter. Fig. 6 is a plan view partly in section of the removable body portion. Fig. 7 illustrates a detail, and Figs. 8 and 8$^a$ illustrate a modification in which a primary oil heater is employed in combination with a vaporizer or carbureter.

Referring now to Figs. 1 and 2, the casing of the vaporizer or carbureter is indicated at 1 and in the form shown is cylindrical. This casing is provided with caps 2 and 3 either bolted to the casing or screwed thereto in any convenient manner. The cap 2 is provided with an extension 4 in which a throttle 5 is located in the usual manner. A float chamber 6 may be integral with, or secured to, the casing 1 and provided with a cap 7. Within the cylindrical portion of the casing 1 are arranged tube plates 8 and 9 between which are assembled a number of tubes 10. The cap 2 incloses a chamber 11 hereinafter called the mixing chamber while the cap 3 and the tube plate 9 inclose a chamber 12. The tubes 10 establish direct communication between the chambers 12 and 11 and these tubes are perforated, for instance at 13. The space 14 surrounding the tubes 10 and inclosed between the plates 8 and 9 and the inner wall of the casing 1 constitutes a liquid fuel chamber communicating by means of a pipe or duct 15 with the interior of the float chamber. The upper extremity of the fuel chamber communicates by means of the holes 13 with the interior of the tubes 10. At a point below the perforations 13 one or more sheets of gauze 16 are arranged about the pipes 10 for the purpose hereinafter referred to.

The float chamber 6 contains a float 17 adjustably mounted upon the spindle 18 which coöperates with a seating upon the cover 7 to form a valve. It should be noted that the supply of fuel to the float chamber takes place in the downward direction. It is desirable, however, that the spindle 18 should be pressed up close against its seating so as to quite cut off the supply of fuel when the chamber is full and for this purpose we provide a so-called lifter 19. This lifter is shown in dotted lines in Fig. 2 and comprises side members 20 and 21 connected by means of a bar 22 perforated so that the spindle 18 may pass through. A bar 23 is also mounted in the side members 20 and 21 which are shaped somewhat in the manner shown in Fig. 1. The points 24 of the side members act as pivots and when the float rises the weight of the bar 23 causes that end of the lifter to fall and the other extremity of the lifter 25 to assist the upward movement of the float and press the coned surface on the spindle into contact with the seating in the cover 7. The lifter is quite free to turn around into any position. As the chamber becomes depleted of fuel, the weight of the float 17 presses on the extremities 25 of the lifter 19 and causes it to assume the position shown in full lines in Fig. 1.

The extension 26 of the cap 3 is provided with a perforated base 27 into which a rod 28 is screw-threaded. On the inside of the base 27 is another plate 29 which is also perforated, but the perforations in the two plates are not in alinement. The rod 28 is provided with a collar or flange 30 and between the flange 30 and the plate 29 a spring 31 is arranged. The tension of this spring may be adjusted by rotating the rod 28 by means of the nut or hand wheel 32.

The operation of the device is as follows:—On the suction stroke of the engine, the pressure within the carbureter is reduced and the plate 29 lifts, thereby admitting air into the chamber 12. This air then passes upwardly through the tubes 10 into the chamber 11 and when passing the holes 13 fuel vapor is drawn into the chamber 11 from whence the flow of mixture to the engine is controlled in the usual manner by the throttle 5. The arrangement is such that there will be a certain reduction of pressure within the vaporizer before the plate 29 lifts to admit air and this initial reduction of pressure assists the volatilization of the fuel.

The object of providing the gauze plate 16 is two-fold. On the one hand it serves to prevent fuel from washing out through the holes 13 into the tubes 10 owing to excessive vibration or tilting, and on the other hand this gauze serves to prevent the ignition of the fuel in cases of back-fire.

It should be noted that the assemblage of tube plates and tubes is held in place between a flange 33 on the casing and the cap 3. When the latter is removed the assemblage consisting of the tube plates 8 and 9 and the tubes 10 may be removed bodily.

The walls of the casing 1 as shown are made hollow and provided with an inlet 34 and an outlet 35 for hot water or burnt gases.

In the modification shown in Figs. 3 and 4, the casing 1 is slotted at 36 and an additional tube plate 37 is employed. Between the tube plates 8 and 37 another set of tubes 38 is arranged. The three tube plates 8, 9 and 37 together with their associated tubes 10 and 38 forming a removable element which is normally held in place as above described by the flange 33 and the cap 3. The upper portion of the casing which accommodates a tube 39 is provided with a valve arrangement 40 substantially similar to that shown in Fig. 1. This tube passes across a diameter of the casing and is secured thereto in any convenient manner, as for instance by means of screw-threads and the plate 41. Within the tube 39 is a sleeve 42, both the sleeve and the tube are perforated, for instance as shown at 43. A pin carried by the sleeve 42 passes through the plate 41 and has secured thereto a handle 45 by means of which the sleeve 42 may be displaced angularly relatively to the tube 39 so as to regulate the amount of air admitted from the interior of the tube 39 into the chamber 11. If necessary a mixing plate 46 is provided within the chamber 11 and above the tube 39. The arrangement described is designed especially for vaporizing heavy oils such as paraffin and operates in the following manner:—The hot gases from the engine enter the cap 3 at 47 and pass upwardly through the tubes 10 into the space formed between the plates 8 and 37 from whence it passes out of the casing through the opening 36. The tubes 10 are made large so as to secure a large amount of heating surface and the fuel which surrounds these tubes is thereby heated sufficiently to vaporize it. The vapor then passes through the tube 38 and through the multiplex gauze 16 where it meets the air coming through the holes 43. The mixture after passing through the plate 46 in the well known manner becomes more thoroughly mixed. It is necessary, however, when using paraffin or other heavy oils as fuel, to provide means for starting up the engine with any light hydrocarbon or readily volatilized spirit and for this purpose the float chamber is provided with a two-way cock 48 as will be readily understood. As soon as the engine is started up with spirit the handle 49 is turned so as to cut off the supply of spirit and connect the float chamber to a supply of oil.

Another modification is illustrated in Figs. 5 and 6. In this construction the tubes 10 are all of different diameters and arranged between the plates 8 and 9 concentrically. A number of gauze partitions 16¹ are arranged between the tubes for the purpose hereinbefore described. It will be seen on reference to Fig. 6, however, that the tube plates 8 and 9 are only provided with curved slots 50 whereby the air from the chamber 12 can pass upwardly into the mixing chamber 11. In this case also the main air valve is modified, the spring 31 being arranged outside the cover and a disk 51 substituted for the base 27 and disk 29.

A further improvement shown in Fig. 5 consists in the provision of a gage glass 52 in communication with the float chamber 6 for the purpose of ascertaining without difficulty the level of fuel within the vaporizer. In order to establish communication between the fuel compartments comprised between the respective concentric tubes, one or more pipes 15¹ may be arranged in the manner shown.

It is sometimes desirable to provide a supply of hot air for the carbureter instead of cold air and such an arrangement is shown in Fig. 7. In this figure instead of the cap 3 a modified cap 3¹ is employed. This cap is preferably screw-threaded and carries an extension 53 which communicates at its lower extremity with a pipe or other suitable arrangement drawing hot air from around the exhaust pipe. The admission of hot air is controlled in the following manner: Within the extension 53 a cup-shaped member 54 is arranged and preferably screw-threaded to the cap 3¹. This cup-shaped member carries a supporting plate 55 secured thereto by means of screws 56. The plate 55 forms a support for a sleeve 57 adapted to be rotated about the cup 54. Both the sleeve and the cup are slotted or perforated at 58 for instance and the sleeve 57 is provided with a handle 58¹ passing through a slot 59 in the extension 53. By means of the handle 58¹ the amount of hot air admitted to the carbureter may be regulated at will.

Figure 8:
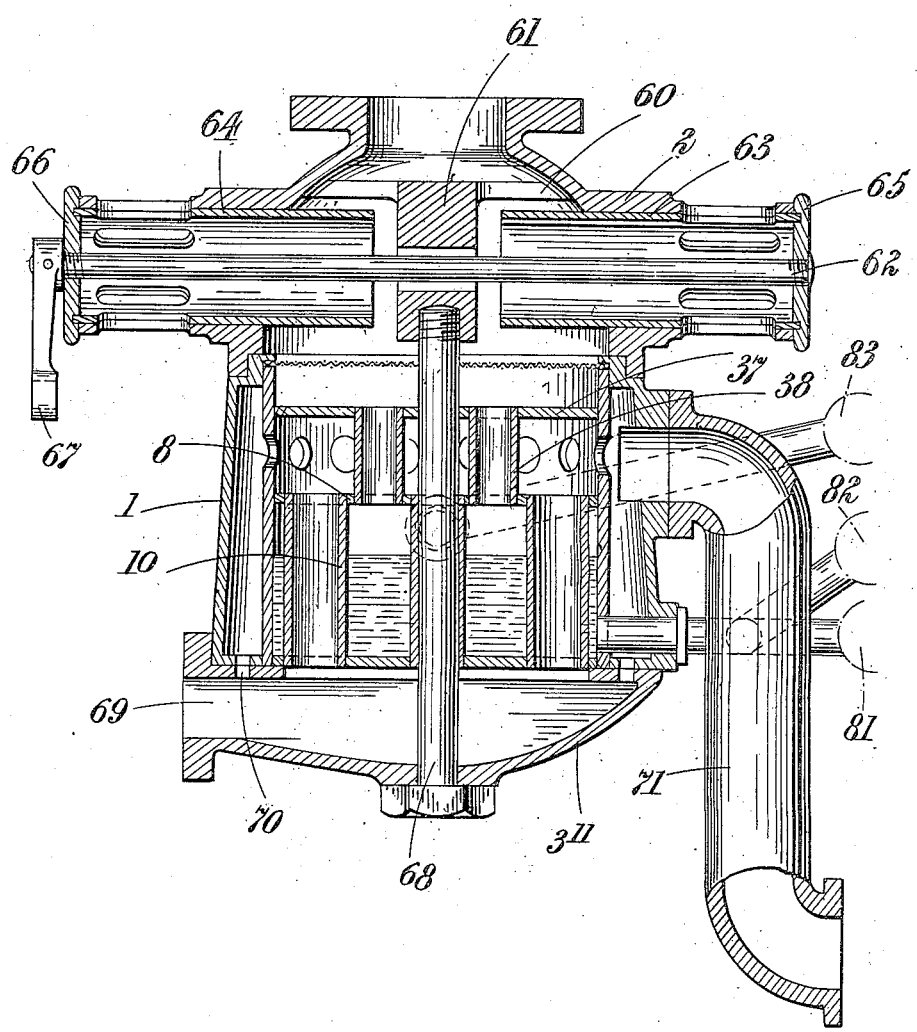

Fig. 8 shows a primary oil heater associated with a modified construction of vaporizer. The means for regulating the air inlet are located in the cap 2. The cap is provided with a four-armed spider 60 carrying a perforated boss 61 through which the shaft 62 passes. Mounted upon the shaft are perforated sleeves 63 and 64 having covers 65 and 66. The lateral extensions of the cap 2 are also perforated and by means of the handle 67 the amount of air admitted to the upper extremity of the carbureter may be regulated. The lower cap 3¹¹ is secured to the upper cap 2 by means of a bolt 68 and the two caps when assembled retain the casing 1 and the interior removable body portion in place. The arrangement of tube plates and tubes is slightly modified to accommodate the bolt 68. The exhaust gases enter at 69 and pass upwardly through the tubes 10 and also through the openings 70 into the space between the tube plates 8 and 37 from whence they pass through the pipe 71 into a box or barrel 72 and thence to the silencer or atmosphere. Within the barrel 72 is located a coil 73 communicating by means of a pipe 74 either with an auxiliary tank containing water or with the water cooling system. In the latter case a regulating cock is located in the pipe 74. Secured to the barrel 72 is a primary oil heater represented as a whole at 75. The general construction of this heater is similar to the construction of the vaporizer with which it is associated. The primary oil heater is provided with a float feed device 76 and is connected by means of pipe 77 with the vaporizer. The fuel to be vaporized passes out of the float chamber into the primary oil heater and thence through the pipe 77 into the vaporizer, but while it is in the primary heater 75 its temperature is raised in the following manner:—The coil 73 communicates with the interior of the oil heater and as the water in this coil is heated by the exhaust gases it rises into the heater and into the tubes 10¹. The fuel therefore is given a preliminary heating before being admitted to the vaporizer. A certain amount of water in the coil 73 is converted into steam and this accumulates in the dome 78 of the heater. This dome communicates by means of pipe 79 with the pipe 77 and also by means of pipe 80 with the interior of the vaporizer at a point above the level of the fuel. These connections are indicated partly in dotted lines in Fig. 8. Each of the pipes 77, 79 and 80 is provided with a regulating cock of any suitable type indicated diagrammatically at 81, 82 and 83 respectively. The cock 81 serves for regulating the amount of fuel admitted to the vaporizer, while the cock 82 serves for regulating the amount of steam admitted along with the fuel into the vaporizer and the cock 83 serves to regulate the amount of steam admitted into the space above the fuel in the vaporizer. Inasmuch as the fuel has received a preliminary heating it will be more readily vaporized in the vaporizer and in passing through the tubes 38 which are surrounded by the hot gases, the vapor becomes superheated.

It will be understood that the amount of steam admitted to the vaporizer is very small but it may be regulated at will.

Although we have described several specific ways of putting into practice our invention we do not wish to be limited to these specific constructions described inasmuch as our invention may be carried out in other ways. Neither do we wish to limit ourselves to the use of the vaporizers or carbureters for internal combustion engines, since we may equally well employ any of the constructions for producing hydro-carbon gases for heating or lighting purposes, for instance with lamps or stoves by connecting the latter to the vaporizer or carbureter by a tube of suitable length.

What we claim as our invention and desire to secure by Letters Patent is:—

1. In a vaporizer or a carbureter, the combination with a casing, of an element inclosed by and adapted to be readily removed bodily and as a whole from the casing, said element comprising tube plates and tubes carried thereby, and forming with the casing an air chamber, a fuel chamber and a mixing chamber, and means for heating the fuel chamber.

2. In a vaporizer or a carbureter, the combination with a casing, of an element adapted to be readily removed bodily and as a whole from the casing and to form therewith air and mixing chambers, said element comprising tube plates and tubes carried thereby, the tubes being in two series, with the space between the tubes of one series forming a fuel chamber and the other series of tubes arranged to conduct vaporized fuel to the mixing chamber, and a valve to control the admission of air.

3. In a vaporizer or a carbureter, the combination with a casing, of an element adapted to be readily removed bodily and as a whole from the casing and to form therewith air and mixing chambers, said element comprising tube plates and tubes carried thereby, the tubes being in two series, with the space between the tubes of one series forming a fuel chamber and the other series of tubes arranged to conduct vaporized fuel to the mixing chamber, and means for heating the fuel in the fuel chamber.

4. In a vaporizer or a carbureter, the combination with a casing, of an element adapted to be readily removed bodily and as a whole from the casing and to form therewith air and mixing chambers, said element comprising tube plates and tubes carried thereby, the tubes being in two series, with the space between the tubes of one series forming a fuel chamber and the other series of tubes arranged to conduct vaporized fuel to the mixing chamber, means for heating the fuel in the fuel chamber, and a valve to control the admission of air.

5. In a vaporizer or a carbureter, the combination with a casing, of an element adapted to be readily removed bodily and as a whole from the casing and to form therewith air and mixing chambers, said element comprising tube plates and tubes carried thereby, the tubes being in two series, with the space between the tubes of one series forming a fuel chamber, the tubes of said series serving as a conduit for exhaust gases, and the other series of tubes arranged to conduct vaporized fuel to the mixing chamber.

6. In a vaporizer or a carbureter the combination with a casing of an element inclosed thereby and adapted to be readily removed bodily and as a whole therefrom, said element comprising tube-plates and tubes carried thereby, and forming with the casing an air chamber, a fuel chamber and a mixing chamber, and an automatic valve for controlling the admission of air.

7. In a vaporizer or a carbureter the combination with a casing of an element inclosed thereby and adapted to be readily removed bodily and as a whole therefrom, said element comprising tube-plates and tubes carried thereby, and forming with the casing an air chamber, a fuel chamber and a mixing chamber, and an automatic valve for controlling the admission of air and adapted to establish a partial vacuum to assist the vaporization before the main air-supply is admitted.

8. In a vaporizer or a carbureter the combination with a casing of an element inclosed thereby and adapted to be readily removed bodily and as a whole therefrom, said element comprising tube-plates and tubes carried thereby, and forming with the casing an air chamber, a fuel chamber and a mixing chamber, an automatic valve for controlling the admission of air and means for heating said air.

9. In a vaporizer or a carbureter the combination with a casing of an element inclosed thereby and adapted to be readily removed bodily and as a whole therefrom, said element comprising tube-plates and tubes carried thereby, and forming with the casing an air chamber, a fuel chamber and a mixing chamber, and means for supplying heated oil to said fuel chamber.

10. In a vaporizer or a carbureter the combination with a casing of an element inclosed thereby and adapted to be readily removed bodily and as a whole therefrom, said element comprising tube-plates and tubes carried thereby, and forming with the casing an air chamber, a fuel chamber and a mixing chamber, and means for supplying heated oil and steam to said fuel chamber.

11. In a vaporizer or a carbureter the combination with a casing of an element inclosed thereby and adapted to be readily removed bodily and as a whole therefrom, said element comprising tube-plates and tubes carried thereby, and forming with the casing an air chamber, a fuel chamber and a mixing chamber, and a coil supplied with fuel and water, means for heating said coil by exhaust gases, and means for supplying heated fuel and steam from said coil to the fuel chamber.

In testimony whereof we have signed our names to this specification in the presence of two subscribing witnesses.

MAXIM BERNARD BECKER BOYD.
JAMES RICKARD.

Witnesses:
S. T. RODGER,
PERCY HEWITT.